(12) United States Patent
Panse et al.

(10) Patent No.: US 12,551,293 B2
(45) Date of Patent: Feb. 17, 2026

(54) NAVIGATING AN INTERVENTIONAL DEVICE

(71) Applicant: KONINKLIJKE PHILIPS N.V., Eindhoven (NL)

(72) Inventors: Ashish Sattyavrat Panse, Burlington, MA (US); Grzegorz Andrzej Toporek, Cambridge, MA (US); Molly Lara Flexman, Melrose, MA (US); Ayushi Sinha, Baltimore, MD (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 43 days.

(21) Appl. No.: 18/285,503

(22) PCT Filed: Apr. 6, 2022

(86) PCT No.: PCT/EP2022/059099
§ 371 (c)(1),
(2) Date: Oct. 4, 2023

(87) PCT Pub. No.: WO2022/218773
PCT Pub. Date: Oct. 20, 2022

(65) Prior Publication Data
US 2024/0366307 A1 Nov. 7, 2024

Related U.S. Application Data

(60) Provisional application No. 63/173,517, filed on Apr. 12, 2021.

(51) Int. Cl.
*A61B 34/20* (2016.01)
*G06N 3/0442* (2023.01)
*G06N 3/084* (2023.01)

(52) U.S. Cl.
CPC ........... *A61B 34/20* (2016.02); *G06N 3/0442* (2023.01); *G06N 3/084* (2013.01); *A61B 2034/2051* (2016.02); *A61B 2034/2065* (2016.02)

(58) Field of Classification Search
None
See application file for complete search history.

(56) References Cited

U.S. PATENT DOCUMENTS

| 10,123,841 B2 | 11/2018 | Kim et al. |
| 10,529,088 B2 | 1/2020 | Fine et al. |

(Continued)

FOREIGN PATENT DOCUMENTS

| CN | 110974419 A | 4/2020 |
| WO | 2007109778 A1 | 9/2007 |

(Continued)

OTHER PUBLICATIONS

Alahi et al., "Social LSTM: Human Trajectory Prediction in Crowded Spaces", Proc. IEEE Conf. on CVPR, pp. 961-871, (2016).

(Continued)

*Primary Examiner* — Yi-Shan Yang (57) ABSTRACT

A computer-implemented method of providing navigation guidance for navigating an interventional device within the anatomy, includes: receiving (S110) interventional device shape data (110) representing a shape of the interventional device (120) at one or more time steps ($t_{1 \ldots n}$), the time steps including at least a current time step ($t_n$): inputting (S120) the interventional device shape data (110) into a neural network (130) trained to predict, from the interventional device shape data (110), a future position (140) of one or more portions of the interventional device (120) at one or more future time steps ($t_{n+1 \ldots n+k}$), and a corresponding confidence estimate (150) for the one or more future positions (140); and displaying (S130) the predicted one or more (Continued)

future positions (140), and the corresponding predicted confidence estimate (150).

16 Claims, 6 Drawing Sheets

(56) References Cited

U.S. PATENT DOCUMENTS

| | | | |
|---|---|---|---|
| 2013/0006102 A1* | 1/2013 | Wilkes | A61B 5/283 600/424 |
| 2016/0349044 A1 | 12/2016 | Marell et al. | |
| 2019/0254564 A1 | 8/2019 | Schwartz et al. | |
| 2020/0410666 A1 | 12/2020 | Wagner et al. | |
| 2021/0137634 A1* | 5/2021 | Lang | A61B 90/98 |

FOREIGN PATENT DOCUMENTS

| | | | | |
|---|---|---|---|---|
| WO | 2015165736 A1 | 11/2015 | | |
| WO | 2020022951 A1 | 1/2020 | | |
| WO | 2020030557 A1 | 2/2020 | | |
| WO | WO-2020173816 A1 * | 9/2020 | ............. | A61B 34/20 |
| WO | 2022112076 A1 | 6/2022 | | |

OTHER PUBLICATIONS

Kingma et al M. "Auto-Encoding Variational Bayes", Proc. ICLR, (2014).

Honnorat et al., "Robust guidewire segmentation through boosting, clustering and linear programming", 2010 IEEE International Symposium on Biomedical Imaging: From Nano to Macro, Rotterdam, 2010, pp. 924-927.

International Search report and Written Opinion of PCT/EP2022/059099, dated Aug. 16, 2022.

* cited by examiner

NAVIGATING AN INTERVENTIONAL DEVICE

CROSS-REFERENCE TO PRIOR APPLICATIONS

This application is the U.S. National Phase application under 35 U.S.C. § 371 of International Application No. PCT/EP2022/059099, filed on Apr. 6, 2022, which claims the benefit of U.S. Provisional Patent Application Ser. No. 63/173,517, filed on Apr. 12, 2021. These applications are hereby incorporated by reference herein.

TECHNICAL FIELD

The present disclosure relates to providing navigation guidance for navigating an interventional device within the anatomy. A computer-implemented method, a computer program product, and a system, are disclosed.

BACKGROUND

Minimally invasive interventional procedures involve navigating interventional devices within the anatomy, typically under the guidance of an external imaging modality. For example, interventional devices such as guidewires and catheters are often navigated through the vasculature under imaging guidance from an external X-ray, ultrasound, or magnetic resonance imaging "MRI" imaging modality. Such imaging systems offer the ability to visualize interventional devices, and to some extent, the surrounding anatomy. However, the navigation of interventional devices within the anatomy remains challenging. Interventional devices such as guide wires and catheters are often long and flexible, and typically there is no one-to-one correspondence between manipulations of the proximal end of the interventional device, and a resulting movement of the distal end of the interventional device within the anatomy. For example, when navigating a guidewire within the vasculature in order to cannulate a bifurcation, a physician typically manipulates the proximal end of the guidewire by twisting it and moving it back and forth in order to effect a desired movement at the distal end. The physician may repeat these manipulations multiple times whilst viewing the distal end of the guidewire in live X-ray images in order to guide the distal end of the guidewire into a desired branch of the bifurcation.

In some instances, the proximal end of the interventional device is manipulated manually by the physician directly handling the distal end of the interventional device. In other instances the physician manually controls a robotic controller that provides a mechanical interface with the proximal end of the interventional device. In yet other instances, a robotic controller automatically manipulates the proximal end of the interventional device. Robotic controllers that use rollers and/or fingers that grip the proximal end of the guidewire in order to translate and/or rotate the distal end of the interventional device within the anatomy are known for this purpose.

However, there remains a need for improvements in navigating interventional devices within the anatomy.

SUMMARY

According to one aspect of the present disclosure, a computer-implemented method of providing navigation guidance for navigating an interventional device within the anatomy, is provided. The method includes:

receiving interventional device shape data representing a shape of the interventional device at one or more time steps, the time steps including at least a current time step;

inputting the interventional device shape data into a neural network trained to predict, from the interventional device shape data, a future position of one or more portions of the interventional device at one or more future time steps, and a corresponding confidence estimate for the one or more future positions; and displaying the predicted one or more future positions of each portion of the interventional device, and the corresponding predicted confidence estimate for the predicted one or more future positions.

Further aspects, features, and advantages of the present disclosure will become apparent from the following description of examples, which is made with reference to the accompanying drawings.

DETAILED DESCRIPTION

Examples of the present disclosure are provided with reference to the following description and figures. In this description, for the purposes of explanation, numerous specific details of certain examples are set forth. Reference in the specification to "an example", "an implementation" or similar language means that a feature, structure, or characteristic described in connection with the example is included in at least that one example. It is also to be appreciated that features described in relation to one example may also be used in another example, and that all features are not necessarily duplicated in each example for the sake of brevity. For instance, features described in relation to a computer implemented method, may be implemented in a computer program product, and in a system, in a corresponding manner.

In the following description, reference is made to computer-implemented methods that relate to navigating an interventional device within the anatomy. Reference is made to examples wherein interventional devices are navigated in the vasculature. In this regard it is to be appreciated that the methods may be used to navigate interventional device within venous, or arterial, or cardiac regions of the vasculature. Reference is made to examples wherein an interventional device in the form of a guidewire is navigated within the vasculature. However, these examples are purely illustrative, and it is to be appreciated that the methods may be used to navigate other types of interventional devices within the vasculature, including catheters, intravascular imaging catheters including intravascular ultrasound "IVUS" and optical coherence tomography "OCT" imaging catheters, transesophageal echocardiogram "TEE" imaging probes, intravascular blood pressure sensing devices, intravascular blood flow sensor devices, and so forth.

It is also, however, to be appreciated that the methods disclosed herein may be used to navigate interventional devices within other lumens within the anatomy in a similar manner. For example, the methods may be used to navigate interventional devices within the digestive tract, the respiratory tract, the urinary tract, and so forth.

Reference is also made herein to examples wherein an interventional device is navigated by manipulating the proximal end of the interventional device by hand. However, it is also to be appreciated that the methods disclosed herein may be used in a similar manner to guide the navigation of interventional devices when the proximal end of the interventional device is manipulated manually or automatically by a robotic controller.

It is noted that the computer-implemented methods disclosed herein may be provided as a non-transitory computer-readable storage medium including computer-readable instructions stored thereon, which, when executed by at least one processor, cause the at least one processor to perform the method. In other words, the computer-implemented methods may be implemented in a computer program product. The computer program product can be provided by dedicated hardware, or hardware capable of running the software in association with appropriate software. When provided by a processor, the functions of the method features can be provided by a single dedicated processor, or by a single shared processor, or by a plurality of individual processors, some of which can be shared. The explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non-volatile storage device, and the like. Furthermore, examples of the present disclosure can take the form of a computer program product accessible from a computer-usable storage medium, or a computer-readable storage medium, the computer program product providing program code for use by or in connection with a computer or any instruction execution system. For the purposes of this description, a computer-usable storage medium or a computer readable storage medium can be any apparatus that can comprise, store, communicate, propagate, or transport a program for use by or in connection with an instruction execution system, apparatus, or device. The medium can be an electronic, magnetic, optical, electromagnetic, infrared, or a semiconductor system or device or propagation medium. Examples of computer-readable media include semiconductor or solid state memories, magnetic tape, removable computer disks, random access memory "RAM", read-only memory "ROM", rigid magnetic disks and optical disks. Current examples of optical disks include compact disk-read only memory "CD-ROM", compact disk-read/write "CD-R/W", Blu-Ray™ and DVD.

As mentioned above, the manipulation of interventional devices within the anatomy can be challenging. This is because interventional devices such as guide wires and catheters are often long and flexible, and typically there is no one-to-one correspondence between manipulations of the proximal end of the interventional device, and a resulting movement of the distal end of the interventional device within the anatomy.

By way of an example, endovascular procedures often require the navigation of interventional devices to specific locations in the cardiovascular system. The navigation begins at an access point, for example at a femoral, brachial, radial, jugular, pedal, etc. region, and the physician navigates the interventional device through the vascular tree to the desired location. The vascular anatomy is highly complex, and a pre-procedural image of the subject is often generated for use by the physician in subsequently guiding the interventional device within the anatomy. Computed tomography angiographic "CTA" images, or magnetic resonance angiographic "MRA" images, are often generated for this purpose.

Figure 1:
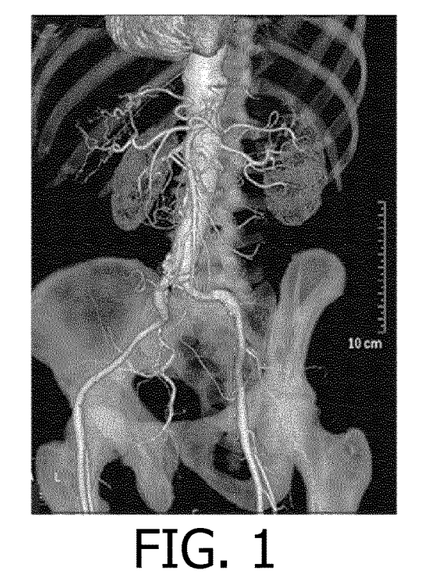
FIG. 1 illustrates an example of a pre-procedural CTA image representing the abdominal arterial vasculature.

By way of an example, FIG. 1 illustrates an example of a pre-procedural CTA image representing the abdominal arterial vasculature. The CT angiographic image illustrated in FIG. 1 is obtained by performing CT imaging on a patient after the injection of a contrast agent. The contrast agent highlights lumens within the vasculature that would otherwise be invisible in CT images owing to the similarity of the X-ray attenuation coefficient of vascular lumens, and blood therein, with that of water.

During the insertion of an interventional device, intra-procedural images from an external, i.e. an extra-body, imaging system are typically used to navigate the interventional device within the anatomy. Intra-procedural images may be generated for this purpose by an X-ray imaging system, or another external imaging system such as MRI imaging system, or an ultrasound imaging system. In the example of an X-ray imaging system, a contrast agent may again be employed in order to visualize the vasculature. In some cases, digital subtraction angiography "DSA" images may be generated to improve the visualization by removing background image features such as bone that might otherwise confound visualization of the vasculature. DSA images are generated by subtracting the X-ray image intensity values of an X-ray image of the vasculature that is generated prior to the injection of a contrast agent into the vasculature, from X-ray images of the vasculature that are generated after the contrast agent has been injected.

Figure 2:
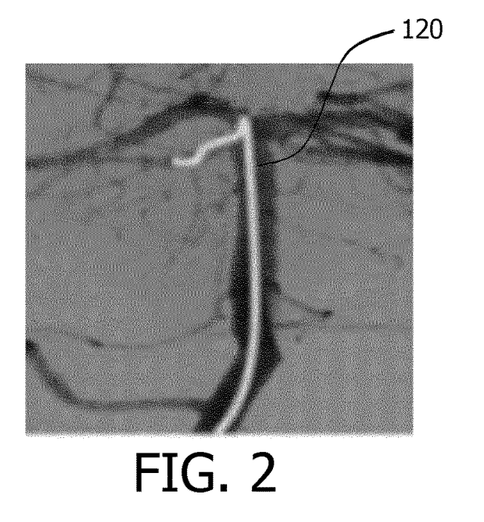
FIG. 2 illustrates an example of an intra-procedural DSA image of a portion of the vasculature, and includes a guidewire 120 that is highlighted as a light-shaded region.

By way of an example, FIG. 2 illustrates an example of an intra-procedural DSA image of a portion of the vasculature, and includes a guidewire 120 that is highlighted as a light-shaded region. When navigating the guidewire within the vasculature, the physician typically injects a pulse of contrast agent whilst live DSA images such as that illustrated in FIG. 2, are generated. This enables the physician to immediately see the effect on the distal end of the guidewire that results from their manipulations of the proximal end of the guidewire. However, since there is no one-to-one correspondence between manipulations of the proximal end of the guidewire, and a resulting movement of the distal end of the guidewire, the physician often has to manipulate the proximal end of the guidewire by twisting it and moving it back and forth in order to effect a desired movement at the distal end.

Figure 3:
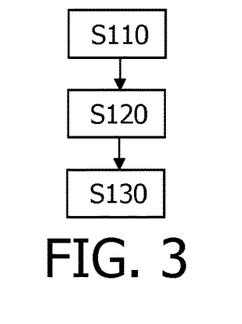
FIG. 3 illustrates an example of a method of providing navigation guidance for navigating an interventional device within the anatomy, in accordance with some aspects of the disclosure.

The inventors have determined an improved method of providing navigation guidance for navigating interventional devices, such as guidewires as described in the above example, within the anatomy. FIG. 3 illustrates an example of a method of providing navigation guidance for navigating an interventional device within the anatomy, in accordance with some aspects of the disclosure. With reference to FIG. 3, the method includes:

receiving S110 interventional device shape data 110 representing a shape of the interventional device 120 at one or more time steps $t_{1 \ldots n}$, the time steps including at least a current time step $t_n$;

inputting S120 the interventional device shape data 110 into a neural network 130 trained to predict, from the interventional device shape data 110, a future position 140 of one or more portions of the interventional device 120 at one or more future time steps $t_{n+1 \ldots n+k}$, and a corresponding confidence estimate 150 for the one or more future positions 140; and displaying S130 the predicted one or more future positions 140 of each portion of the interventional device 120, and the corresponding predicted confidence estimate 150 for the predicted one or more future positions 140.

The interventional device shape data 110 may be received from various sources, including a database, an imaging system, a computer readable storage medium, the cloud, and so forth. The data may be received using any form of data communication, such as wired or wireless data communication, and may be via the internet, an ethernet, or by transferring the data by means of a portable computer-readable storage medium such as a USB memory device, an optical or magnetic disk, and so forth.

The interventional device shape data 110 may be generated by various imaging systems, or alternatively by position determination systems. The data may represent a two-dimensional, or a three-dimensional shape of the interventional device. For example, the interventional device shape data 110 may include a temporal sequence of X-ray images including the interventional device 120, e.g. calibrated bi-plane X-ray images that provide 3D shape information, or a temporal sequence of computed tomography images including the interventional device 120, or a temporal sequence of ultrasound images including the interventional device 120, or a temporal sequence of magnetic resonance images including the interventional device 120, or a temporal sequence of positions provided by a plurality of electromagnetic tracking sensors or emitters mechanically coupled to the interventional device 120, or a temporal sequence of positions provided by a plurality of fiber optic shape sensors mechanically coupled to the interventional device 120, or a temporal sequence of positions provided by a plurality of dielectric sensors mechanically coupled to the interventional device 120, or a temporal sequence of positions provided by a plurality of ultrasound tracking sensors or emitters mechanically coupled to the interventional device 120. The interventional device shape data 110 may include a combination of one or more of these data types.

When the interventional device shape data 110 is generated by an imaging system, various known segmentation techniques may be used to extract the shape of the interventional device from the above-described temporal sequence of images. Segmentation techniques such as those disclosed in a document by Honnorat, N., et al., entitled "Robust guidewire segmentation through boosting, clustering and linear programming", 2010 IEEE International Symposium on Biomedical Imaging: From Nano to Macro, Rotterdam, 2010, pp. 924-927, may for example be used. Portions of the interventional device may be identified in the images by, for example, defining groups of one or more pixels on the interventional device in the images. The portions may be defined arbitrarily, or at regular intervals along the length of the interventional device. In so doing, the position of each portion of the interventional device may be provided at each time step $t_1 \ldots t_n$.

When the interventional device shape data 110 is generated by electromagnetic tracking sensors or emitters, electromagnetic tracking sensors or emitters such as those disclosed in document WO 2015/165736 A1 may be employed to provide a position of each sensor or emitter at each time step $t_1 \ldots t_n$. When the interventional device shape data 110 is generated by fiber optic shape sensors, fiber optic shape sensors such as those disclosed in document WO2007/109778 A1, may be employed. When the interventional device shape data 110 is generated by dielectric sensors, dielectric sensors such as those disclosed in document US 2019/254564 A1 may be employed. When the interventional device shape data 110 is generated by ultrasound tracking sensors or emitters, ultrasound tracking sensors or emitters such as those disclosed in document WO 2020/030557 A1 may be employed.

Figure 4:
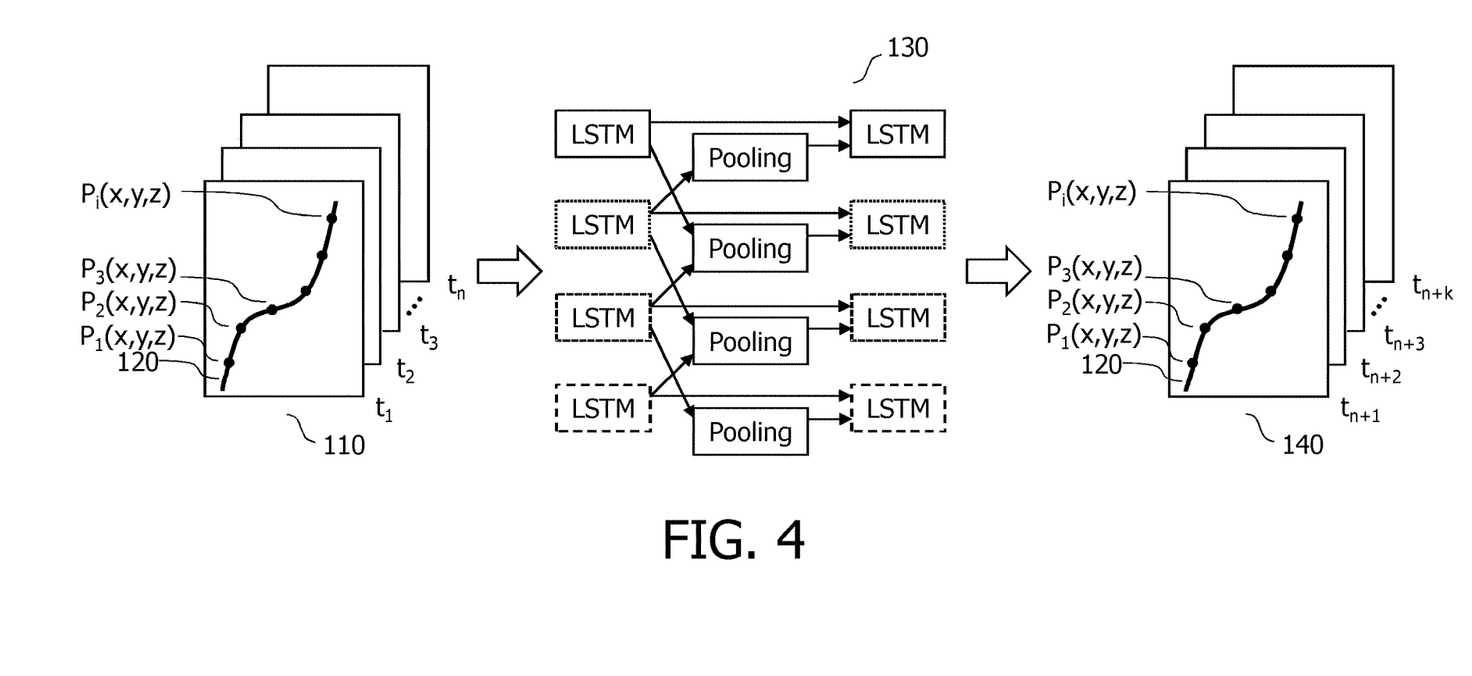
FIG. 4 illustrates an example of a neural network 130 for predicting a future position of one or more portions of an interventional device, in accordance with some aspects of the disclosure.

Various neural network architectures may be used to provide the neural network 130 described above with reference to FIG. 3. FIG. 4 illustrates an example of a neural network 130 for predicting a future position of one or more portions of an interventional device, in accordance with some aspects of the disclosure. The neural network 130 illustrated in FIG. 4 has an LSTM architecture, and includes a first layer of Long Short Term Memory "LSTM" cells towards the left side of FIG. 4, a Pooling layer, and a second layer of LSTM cells towards the right side of FIG. 4.

Interventional device shape data 110 is inputted into the first layer of LSTM cells in FIG. 4 in accordance with the operation S120 described above with reference to FIG. 3. Interventional device shape data 110 is inputted in the form of the positions $P_i(x, y, z)$ of i points on the interventional device, at each of n time steps, including current time step $t_n$. In other words, the interventional device shape data 110 is inputted for time steps $t_1 \ldots t_n$. The inputted positions $P_i(x, y, z)$ in the illustrated example represent three-dimensional positions of portions of the interventional device. The inputted positions may alternatively, as mentioned above, represent two-dimensional positions of portions of the interventional device. The positions may be determined from an inputted image, or from the positions of sensors and/or receivers coupled to the interventional device 120. Each LSTM cell in the first layer is inputted with position data for a different portion, or point on the interventional device.

The LSTM cells in the first layer of LSTM cells in FIG. 4 generate hidden states relating to the predicted future positions of their respective point on the interventional device. The hidden states are shared for neighboring points on the interventional device by the Pooling layer, and inputted into the second layer of LSTM cells, which generate the predictions of the future positions.

The pooling layer in FIG. 4 allows for sharing of information in the hidden states between neighboring LSTM cells. This captures the influence of neighboring portions on the device on the motion of the portion on the device being predicted. This improves the accuracy of the prediction because it preserves position information about neighboring portions on the interventional device, and thus the continuity of the interventional device shape. The extent of the neighborhood: i.e. the number of neighboring portions, and the range within which the positions of neighboring portions are used in predicting the future positions of the portions of the interventional device, may range between immediate neighboring 20) portions to the entire interventional device. The extent of the neighborhood may also depend on the flexibility of the device. For example, a rigid device may use a relatively larger neighborhood where as a flexible device may use a relatively smaller neighborhood. Alternatives to the illustrated Pooling layer include applying constraints to the output of the neural network by eliminating predicted positions which violate the continuity of the device, or which predict a curvature of the interventional device that exceeds a predetermined value.

The output data that generated by the neural network 130 in FIG. 4 is the predicted positions of the i points on the interventional device at each of k future time steps, i.e. at time steps $t_{n+1} \ldots t_{n+k}$.

Figure 5:
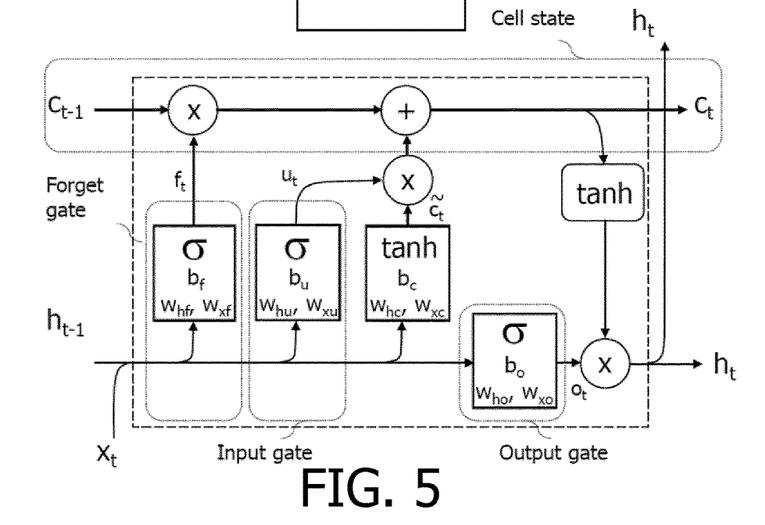
FIG. 5 is a schematic diagram illustrating an example LSTM cell.

The operation of each LSTM cell in FIG. 4 is described below with reference to FIG. 5, which is a schematic diagram illustrating an example LSTM cell. With reference to FIG. 5, an LSTM cell includes three inputs: $h_{t-1}$, $c_{t-1}$ and $x_t$, and two outputs: $h_t$ and $c_t$. The sigma and tanh labels respectively represent sigmoid and tanh activation functions, and the "x" and the "+" symbols respectively represent pointwise multiplication and pointwise addition operations. At time, t, output $h_t$ represents the hidden state, output $c_t$ represents the cell state, and input $x_t$ represents the current data input. Moving from left to right in FIG. 5, the first sigmoid activation function provides a forget gate. Its inputs: $h_{t-1}$ and $x_t$, respectively representing the hidden state of the previous cell, and the current data input, are concatenated and passed through a sigmoid activation function. The output of the sigmoid activation function is then multiplied by the previous cell state, $c_{t-1}$. The forget gate controls the amount of information from the previous cell that is to be included in the current cell state $c_t$. Its contribution is included via the pointwise addition represented by the "+" symbol. Moving towards the right in FIG. 5, the input gate controls the updating of the cell state $c_t$. The hidden state of the previous cell, $h_{t-1}$, and the current data input, $x_t$, are concatenated and passed through a sigmoid activation function, and also through a tanh activation function. The pointwise multiplication of the outputs of these functions determines the amount of information that is to be added to the cell state via the pointwise addition represented by the "+" symbol. The result of the pointwise multiplication is added to the output of the forget gate multiplied by the previous cell state $c_{t-1}$, to provide the current cell state $c_t$. Moving further towards the right in FIG. 5, the output gate determines what the next hidden state, $h_t$, should be. The hidden state includes information on previous inputs, and is used for predictions. To determine the next hidden state, $h_t$, the hidden state of the previous cell, $h_{t-1}$, and the current data input, $x_t$, are concatenated and passed through a sigmoid activation function. The new cell state, $c_t$, is passed through a tanh activation function. The outputs of the tanh activation function and the sigmoid activation function are then multiplied to determine the information in the next hidden state, $h_t$.

Thus, in one example, the neural network 130 used in the method described with reference to FIG. 3, includes a LSTM architecture having a plurality of LSTM cells, and wherein each LSTM cell comprises an output configured to predict the future position 140 of a different portion $P_1 \ldots P_i$ of the interventional device 120 at the one or more future time steps $t_{n+1 \ldots n+k}$. For each LSTM cell, the cell is configured to predict the future position 140 of the portion of the interventional device 120 at the one or more future time steps $t_{n+1 \ldots n+k}$, based on the inputted interventional device shape data 110 for the current time step $t_n$, and the predicted future position of one or more neighboring portions of the interventional device 120 at the one or more future time steps $t_{n+1 \ldots n+k}$.

The neural network 130 illustrated in FIG. 4 may be trained to predict the future positions 140 using interventional device shape training data, and ground truth position data.

Figure 6:
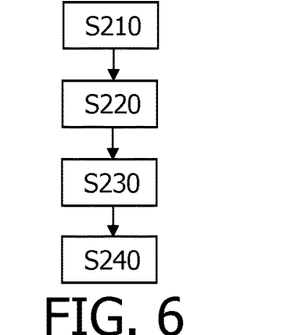
FIG. 6 illustrates an example of a method of training a neural network to predict the future position of the one or more portions of an interventional device, in accordance with some aspects of the disclosure.

FIG. 6 illustrates an example of a method of training a neural network to predict the future position of the one or more portions of an interventional device, in accordance with some aspects of the disclosure. The interventional device shape training data represents a shape of the interventional device 120 at a sequence of time steps. The ground truth position data represents a position of each of a plurality of portions of the interventional device 120 at each time step in the sequence. The interventional device shape training data and/or the ground truth position data, may be provided by image data, or by sensor and/or emitter data as described above in relation to the inputted interventional device shape data 110 that is inputted in the operation S120. The neural network 130 may be trained to predict, from the interventional device shape data 110, the future position 140 of the one or more portions of the interventional device 120 at the one or more future time steps $t_{n+1 \ldots n+k}$, by:

receiving S210 interventional device shape training data representing a shape of the interventional device 120 at a sequence of time steps;

receiving S220 interventional device ground truth position data representing a position of each of a plurality of portions of the interventional device 120 at each time step in the sequence; and for each of a plurality of time steps in the sequence, inputting S230 into the neural network, the received interventional device shape training data for the time step, and optionally for one or more earlier time steps, and adjusting S240 parameters of the neural network 130 based on a loss function representing a difference between the predicted subsequent position of the one or more portions of the interventional device 120 at one or more subsequent time steps, and the ground truth position of the one or more corresponding portions of the interventional device 120 at the one or more subsequent time steps from the received interventional device ground truth position data, until a stopping criterion is met.

By way of an example, the interventional device shape training data may be provided by CT image data in which the times of image frames of the CT image data represent a sequence of time steps. In this example, the corresponding interventional device ground truth position data may be provided by electromagnetic tracking sensors or emitters mechanically coupled to the interventional device 120. The generation of the ground truth position data may be synchronized with the timing of the image frames in the CT image data so that the interventional device ground truth position data represents the positions of the interventional device 120 at each time step in the sequence.

As in other neural networks, the training of the neural network illustrated in FIG. 4, is performed by adjusting its parameters, i.e. its weights and biases. The weights and biases of the FIG. 4 neural network are provided by its LSTM cells. With reference to the LSTM cell illustrated in FIG. 5, the lower four activation functions in FIG. 5 are controlled by weights and biases. These are identified in FIG. 5 by means of the symbols w, and b. In the illustrated LSTM cell, each of these four activation functions typically includes two weight values, i.e. one for each $x_t$ input, and one for each $h_{t-1}$ input, and one bias value, b. Thus, the example LSTM cell illustrated in FIG. 5 typically includes 8 weight parameters, and 4 bias parameters.

The operation of the LSTM cell illustrated in FIG. 5 is controlled by the following equations:

$$f_t = \sigma((w_{hf} \times h_{t-1}) + (w_{xf} \times x_t) + b_f) \quad \text{Equation 1}$$

$$u_t = \sigma((w_{hu} \times h_{t-1}) + (w_{xu} \times x_t) + b_u) \quad \text{Equation 2}$$

$$c_t^\sim = \tanh((w_{hc} \times h_{t-1}) + (w_{xc} \times x_t) + b_c) \quad \text{Equation 3}$$

$$o_t = \sigma((w_{ho} \times h_{t-1}) + (w_{xo} \times x_t) + b_o) \quad \text{Equation 4}$$

$$c_t = [c_t^\sim + u_t] + [c_{t-1} + f_t] \quad \text{Equation 5}$$

$$y_t = [o_t \times \tanh c_t] \quad \text{Equation 6}$$

Training neural networks that include the LSTM cell illustrated in FIG. 5, and other neural networks, therefore involves adjusting the weights and the biases of activation functions. Supervised learning involves providing a neural network with a training dataset that includes input data and corresponding expected output data. The training dataset is representative of the input data that the neural network will likely be used to analyze after training. During supervised learning, the weights and the biases are automatically adjusted such that when presented with the input data, the neural network accurately provides the corresponding expected output data.

Training a neural network typically involves inputting a large training dataset into the neural network, and iteratively adjusting the neural network parameters until the trained neural network provides an accurate output. Training is usually performed using a Graphics Processing Unit "GPU" or a dedicated neural processor such as a Neural Processing Unit "NPU" or a Tensor Processing Unit "TPU". Training therefore typically employs a centralized approach wherein cloud-based or mainframe-based neural processors are used to train a neural network. Following its training with the training dataset, the trained neural network may be deployed to a device for analyzing new input data in a process termed "inference". The processing requirements during inference are significantly less than those required during training, allowing the neural network to be deployed to a variety of systems such as laptop computers, tablets, mobile phones and so forth. Inference may for example be performed by a Central Processing Unit "CPU", a GPU, an NPU, a TPU, on a server, or in the cloud.

As outlined above, the process of training a neural network includes adjusting the weights and biases of activation functions. In supervised learning, the training process automatically adjusts the weights and the biases, such that when presented with the input data, the neural network accurately provides the corresponding expected output data. In order to do this, the value of a loss function, or error, is computed based on a difference between the predicted output data and the expected output data. The value of the loss function may be computed using functions such as the negative log-likelihood loss, the mean squared error, or the Huber loss, or the cross entropy. During training, the value of the loss function is typically minimized, and training is terminated when the value of the loss function satisfies a stopping criterion. Sometimes, training is terminated when the value of the loss function satisfies one or more of multiple criteria.

Various methods are known for solving the loss minimization problem such as gradient descent, Quasi-Newton methods, and so forth. Various algorithms have been developed to implement these methods and their variants including but not limited to Stochastic Gradient Descent "SGD", batch gradient descent, mini-batch gradient descent, Gauss-Newton, Levenberg Marquardt, Momentum, Adam, Nadam, Adagrad, Adadelta, RMSProp, and Adamax "optimizers" These algorithms compute the derivative of the loss function with respect to the model parameters using the chain rule. This process is called backpropagation since derivatives are computed starting at the last layer or output layer, moving toward the first layer or input layer. These derivatives inform the algorithm how the model parameters must be adjusted in order to minimize the error function. That is, adjustments to model parameters are made starting from the output layer and working backwards in the network until the input layer is reached. In a first training iteration, the initial weights and biases are often randomized. The neural network then predicts the output data, which is likewise, random. Backpropagation is then used to adjust the weights and the biases. The training process is performed iteratively by making adjustments to the weights and biases in each iteration. Training is terminated when the error, or difference between the predicted output data and the expected output data, is within an acceptable range for the training data, or for some validation data. Subsequently the neural network may be deployed, and the trained neural network makes predictions on new input data using the trained values of its parameters. If the training process was successful, the trained neural network accurately predicts the expected output data from the new input data.

It is to be appreciated that the example LSTM neural network described above with reference to FIG. 4 and FIG. 5 serves only as an example, and other neural networks may likewise be used to implement the functionality of the above-described method. Alternative neural networks to the LSTM neural network 130 may also be trained in order to perform the desired prediction during the training operation S130, including, and without limitation: a recurrent neural network, RNN, a convolutional neural network, CNN, a temporal convolutional neural network, TCN, and a transformer.

In some implementations, the operation of adjusting the parameters of the neural network 130 is further constrained. In one example implementation, the interventional device shape data 110 comprises a temporal sequence of digital subtraction angiography. DSA, X-ray images including the interventional device 120, and the adjusting S240 parameters of the neural network 130 is constrained such that the predicted future position 140 of the one or more portions of the interventional device 120 at the one or more future time steps $t_{n+1 \ldots n+k}$, fits within a lumen represented in the DSA X-ray images. In so doing, the future positions of the one or more portions of the interventional device may be predicted with higher accuracy. The constraint may be applied by computing a second loss function based on the constraint, and incorporating this second loss function, together with the aforementioned loss function, into an objective function, the value of which is then minimized during training.

The neural network 130 described above is also trained to predict a corresponding confidence estimate 150 for the one or more future positions 140. Various methods are contemplated for predicting the confidence estimate.

In one example, the neural network 130 is trained to predict the corresponding confidence estimate for the predicted future position 140 of the one or more portions of the interventional device 120 at the one or more future time steps $t_{n+1 \ldots n+k}$ based on a difference between the predicted future position 140 of the one or more portions of the interventional device 120 at the one or more future time steps $t_{n+1 \ldots n+k}$ generated by the neural network 130, and the ground truth position of the one or more corresponding portions of the interventional device 120 at the one or more future time steps $t_{n+1 \ldots n+k}$ from the received interventional device ground truth position data.

In another example the neural network 130 comprises a dropout layer configured to randomly control a contribution of the neurons in the dropout layer to the predicted future position 140 of the one or more portions of the interventional device 120 at the one or more future time steps $t_{n+1 \ldots n+k}$, such that a confidence estimate for the predicted future position 140 of the one or more portions of the interventional device 120 at the one or more future time steps $t_{n+1 \ldots n+k}$ is obtainable from the predicted future positions 140 of the one or more portions of the interventional device 120 at the one or more future time steps $t_{n+1 \ldots n+k}$ generated by repetitively executing the trained neural network 130 with the same input data. Other techniques may also be used to predict the corresponding confidence estimate 150, for instance, by predicting distributions rather than point estimates for the one or more portions of the interventional device at the one or more future time steps, and using the standard deviation as a measure of confidence (smaller standard deviation implying higher confidence, larger standard deviation implying lower confidence, and so forth).

Returning to FIG. 3, in the operation S130, the predicted one or more future positions 140 of each portion of the interventional device 120, and the corresponding predicted confidence estimate 150 for the predicted one or more future positions 140, are displayed. Various techniques are contemplated for use in the operation S130. By way of an example, a current image of the interventional device may be displayed, and the predicted future positions of the one or more portions of an interventional device, and the corresponding predicted confidence estimate for the predicted future positions, may be displayed in the current image.

Figure 7:
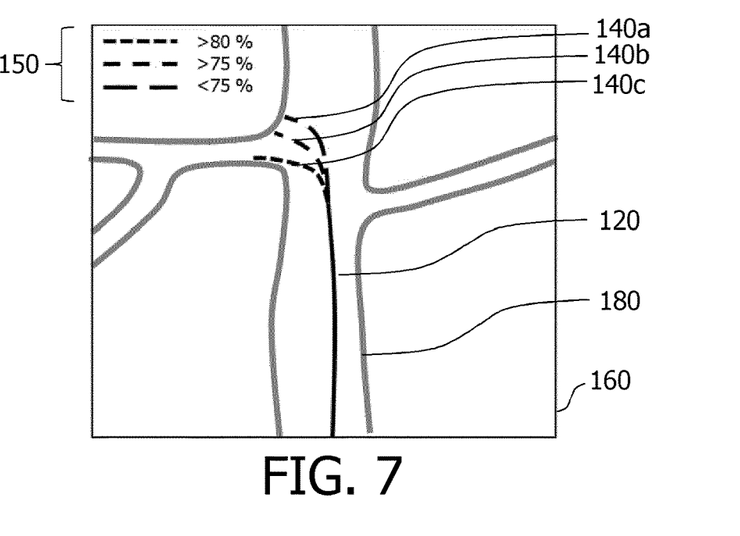
FIG. 7 illustrates an example of a current X-ray image 160 including predicted future positions 140a, 140b, 140c of portions of an interventional device 120, and the corresponding predicted confidence estimate 150 for the predicted future positions, in accordance with some aspects of the disclosure.

By way of another example, FIG. 7 illustrates an example of a current X-ray image 160 including predicted future positions 140a, 140b, 140c of portions of an interventional device 120, and the corresponding predicted confidence estimates 150 for the predicted future positions, in accordance with some aspects of the disclosure. The outline of vascular lumen 180 is illustrated in FIG. 7, and may be determined by generating the X-ray image 160 using a DSA imaging technique. The current position of the interventional device 120 is illustrated in FIG. 7 by way of the solid curve representing the interventional device 120. The predicted future positions of portions of the distal end of the interventional device for each of three confidence estimate values >80%, >75%, and <75%, are illustrated by way of the dashed lines.

Alternative techniques to those illustrated in FIG. 7 for displaying the current and/or future position of the interventional device 120 are also contemplated. These include the use of different colors or shading to illustrate the confidence estimate, a heat map, and so forth. In some examples, the position of one and only one portion of the interventional device is predicted, such as for example the distal end of the interventional device 120. The computer-implemented methods described above with reference to FIG. 3 may include one or more additional operations.

In some interventional procedures it is beneficial to know whether or not a particular portion of the interventional device 120, will intercept a desired target position. For example, with reference to FIG. 7, it is desirable to know whether or not the distal end of the guidewire 120 will successfully enter the left branch of the vascular lumen. In accordance with one example, the method described above with reference to FIG. 3 includes:

receiving input indicative of a target position within the anatomy, for at least one portion of the interventional device 120; and computing, based on the predicted future position 140 of the at least one portion of the interventional device 120, a probability of the at least one portion of the interventional device 120 intercepting the target position.

This functionality may be provided by the neural network 130, or by post-processing the predicted future position(s) 140 and the target position. The target position within the anatomy may be any position within the anatomy, such as for example a left or right renal artery, or another target position. The target position may be provided by a user, of determined automatically. For example, if the target position is provided by a user, the user may indicate the target position by way of a pointer device such as a mouse, or a touch screen, the target position on a display. The target position may alternatively be determined automatically from information regarding the type of medical procedure, and based on an expected path through the anatomy. The computed probability of the at least one portion of the interventional device 120 intercepting the target position may for example be displayed as a numerical value, as a dashed line, or by means of a color or a shading on an image of the anatomy, and so forth.

In another example, and in order to address some of the above-described challenges of manipulating interventional devices, it can be beneficial to indicate to a user a range of historic paths that have been used to successfully navigate the interventional device to intercept a target position within the anatomy. In so doing, a user may determine how the current position of their interventional device compares to that of the successful historic paths, and thereby benefit from the experience of other, i.e. expert, users. This functionality may be provided by training the neural network 130 using training data from the expert users. In accordance with this example, the neural network 130 is configured to generate one or more vectors of latent variables representing a distribution of positions of portions of the inputted interventional device shape data 110 along a plurality of historic paths used to successfully navigate the interventional device 120 to intercept a target position within the anatomy, and the method described above with reference to FIG. 3 includes:

displaying a track 170 within the anatomy representing one or more distribution parameters of the one or more vectors of latent variables.

This example is illustrated with reference to FIG. 8, which illustrates an example of a neural network 130 that generates a vector of latent variables having mean u and variance $\sigma^2$ values representing inputted interventional device shape data 110, in accordance with some aspects of the disclosure. The neural network illustrated in FIG. 8 has a variational encoder-decoder architecture, although other types of generative neural networks, such as a generative adversarial network "GAN", may also be used to implement this functionality. For instance, a neural network may be trained to generate latent representations that follow a normal distribution by adding a KL-divergence/mutual information component to the loss function that ensures that it follows a certain distribution. Adversarial training, common in GANs, has been shown to be successful in capturing low-level representations of input/output data, such as CycleGAN for image translation. The advantage of using a variational encoder-decoder networks is that this type of neural network learns a distribution over the latent representation of the training dataset. Therefore, the neural network 130 illustrated in FIG. 8 learns the mean, $\mu$, and variance, $\sigma^2$, representing the distribution over the latent representation of the input device shapes such that a sample from the distribution represents the future shape of the interventional device given the shape of the interventional device thus far.

Figure 8:
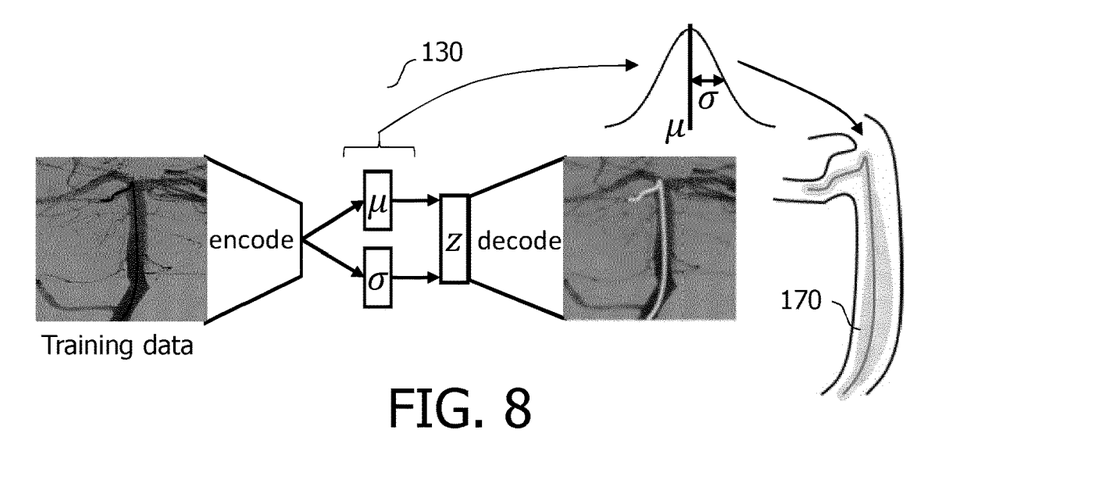
FIG. 8, which illustrates an example of a neural network 130 that generates a vector of latent variables having mean $\mu$ and variance $\sigma^2$ values representing inputted interventional device shape data 110, in accordance with some aspects of the disclosure.

The track 170 is illustrated in FIG. 8 and includes the mean values u and the standard deviation values σ distributed either side of this mean and is indicative of the range of historic paths used to successfully navigate the interventional device 120 to intercept the target position within the anatomy. As seen in FIG. 8, at some positions in the lumen, particularly towards the left branch in the lumen, there is a small variance, indicating the necessity for the user to accurately position the interventional device close to the mean value at this position in the lumen in order to successfully turn into this left branch. By comparison, at lower positions in the lumen, a larger variance is observed, indicating that the positioning of the interventional device is less critical.

Displaying the track 170 in this manner provides additional information to the user in the form of variations in the device path taken by past users. By training the variational encoder-decoder network on device navigation data obtained from experts, i.e. a plurality of historic paths used to successfully navigate the interventional device to intercept a target position within the anatomy, the encoder portion of the neural network illustrated in FIG. 8 approximates the posterior distribution from input data that represents expert device navigation, and the decoder network generates samples from this distribution. This allows less experienced users to observe generated samples from a distribution of expert only device trajectories, including segments of the trajectory with smaller or larger variations and the types of variations in expert navigation.

In the neural network illustrated in FIG. 8, the one or more distribution parameters include both the mean u and the standard deviation σ. It is noted that other statistical distribution parameters may be computed and displayed in the track 170 in a similar manner. Moreover, two vectors of latent variables are illustrated, one for the mean values, and one for the variance values. In some examples, one and only one vector may be computed.

The neural network 130 illustrated in FIG. 8 may be trained to predict, from the interventional device shape data 110, the future position 140 of the one or more portions of the interventional device 120 at the one or more future time steps $t_{n+1 \ldots n+k}$, by:

receiving interventional device shape training data representing a shape of the interventional device 120 at a sequence of time steps for a plurality of historic procedures to successfully navigate the interventional device 120 to intercept the target position within the anatomy;

receiving interventional device ground truth position data representing a position of each of a plurality of portions of the interventional device 120 at each time step in the sequence; and for each of a plurality of time steps in the sequence for a historic procedure:

inputting into the neural network 130, the received interventional device shape training data for the time step, and optionally for one or more earlier time steps, training the neural network 130 to learn the one or more vectors of latent variables representing the distribution of positions of portions of the inputted interventional device shape data 110;

sampling from within the distribution of positions of the portions of the interventional device 120 represented by the one or more vectors of latent variables to provide a future position 140 of the one or more portions of the interventional device 120 at the one or more future time steps $t_{n+1 \ldots n+k}$;

adjusting parameters of the neural network 130 based on:
i) a first loss function representing a difference between the probability of samples in the distribution represented by the one or more vectors of latent variables, and the probability of samples in a standard distribution; and
ii) a second loss function representing a difference between the predicted subsequent position 140 of the one or more portions of the interventional device 120 at the one or more subsequent time steps, and the ground truth position of the one or more corresponding portions of the interventional device 120 at the one or more subsequent time steps from the received interventional device ground truth position data, until a stopping criterion is met; and repeating the inputting, the training, the sampling and the adjusting for each of the plurality of historic procedures.

By way of an example, the first loss function may be computed using the Kullback-Leibler "KL" divergence. The standard distribution that is used may for example be a Gaussian or Normal distribution with mean equal to zero and variance equal to one.

Figure 9:
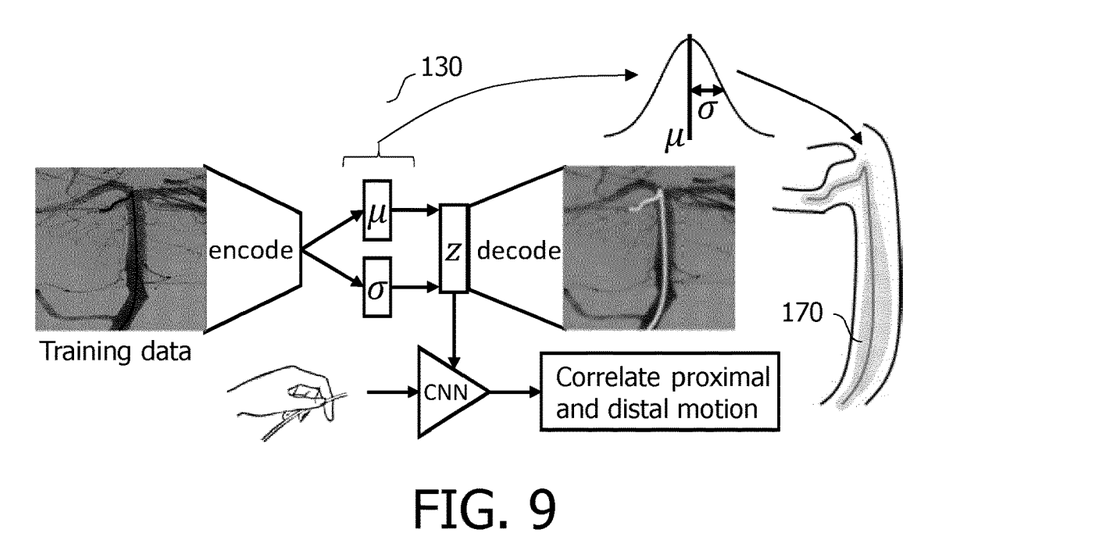
FIG. 9 illustrates an example of a neural network 130 that is trained to predict one or more required manipulations of the interventional device that are required to reduce a difference between a predicted future position of the one or more portions of the interventional device, and the track 170 of mean and standard deviation values of the latent variable, in accordance with some aspects of the disclosure.

The neural network described with reference to FIG. 8 may also be adapted in order to compute one or more required manipulations of the interventional device 120 that are required to reduce a difference between a predicted future position of the one or more portions of the interventional device, and the track 170. This example is described with reference to FIG. 9, which illustrates an example of a neural network 130 that is trained to predict one or more required manipulations of the interventional device that are required to reduce a difference between a predicted future position of the one or more portions of the interventional device, and the track 170 of mean values of the latent variable, in accordance with some aspects of the disclosure. With reference to FIG. 9, in this example, the method described with reference to FIG. 8 also includes:

computing, based on the received interventional device shape data 110 representing a shape of the interventional device 120 for the current time step $t_n$, one or more required manipulations of the interventional device 120 that are required to reduce a difference between a predicted future position 140 of the one or more portions of the interventional device 120 at the one or more future time steps $t_{n+1 \ldots n+k}$, and the track 170 within the anatomy; and displaying the predicted one or more required manipulations of the interventional device 120.

Figure 10A:
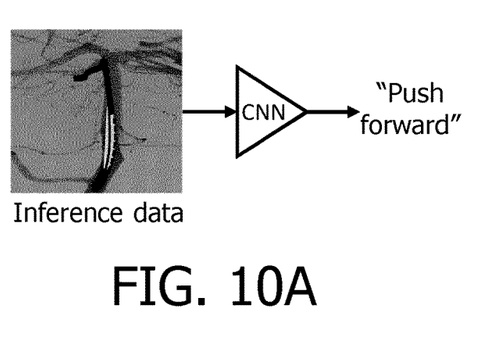
FIGS. 10A and 10B illustrate examples of displaying the predicted one or more required manipulations of the interventional device, using the trained neural network illustrated in FIG. 9, in accordance with some aspects of the disclosure.
Figure 10B:
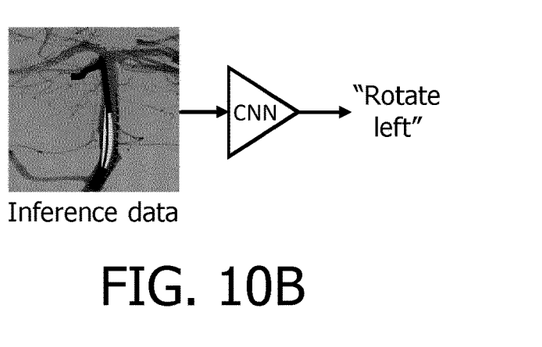

As illustrated in FIG. 9, the neural network 130 may include a convolutional neural network "CNN" architecture in order to implement this functionality. Alternatives architectures to a CNN include RNNs, TCNs, transformers, and so forth. This functionality enables a user to be trained to provide more optimal manipulations for navigating the interventional device within the anatomy. FIGS. 10A and 10B illustrate examples of displaying the predicted one or more required manipulations of the interventional device, using the trained neural network illustrated in FIG. 9, in accordance with some aspects of the disclosure. Alternative techniques for displaying the predicted one or more required manipulations include for example the display of icons such as directional arrows, and so forth.

The neural network illustrated in FIG. 9 may be trained to predict, from the interventional device shape data 110, the one or more required manipulations of the interventional device 120 that are required to reduce a difference between a predicted future position 140 of the one or more portions of the interventional device 120 at the one or more future time steps $t_{n+1 \ldots n+k}$, and the track within the anatomy, by:

receiving interventional device shape training data representing a shape of the interventional device 120 at a sequence of time steps for a plurality of successful historic procedures to navigate the interventional device 120 to intercept the target position;

receiving interventional device ground truth manipulation data representing, for each time step in the sequence, a manipulation of the interventional device 120, and for each of a plurality of time steps in the sequence, inputting into the neural network 130, the received interventional device shape training data for the time step, and adjusting parameters of the neural network 130 based on a third loss function representing a difference between the predicted one or more required manipulations, and the ground truth manipulation data, until a stopping criterion is met.

The interventional device ground truth manipulation data may for example be provided by one or more of:

a robotic control unit configured to manipulate the interventional device 120; and a camera configured to generate image data representing user manipulations of the interventional device 120.

In accordance with another example, the neural network illustrated in FIG. 8 is trained using expert training data.

Figure 11:
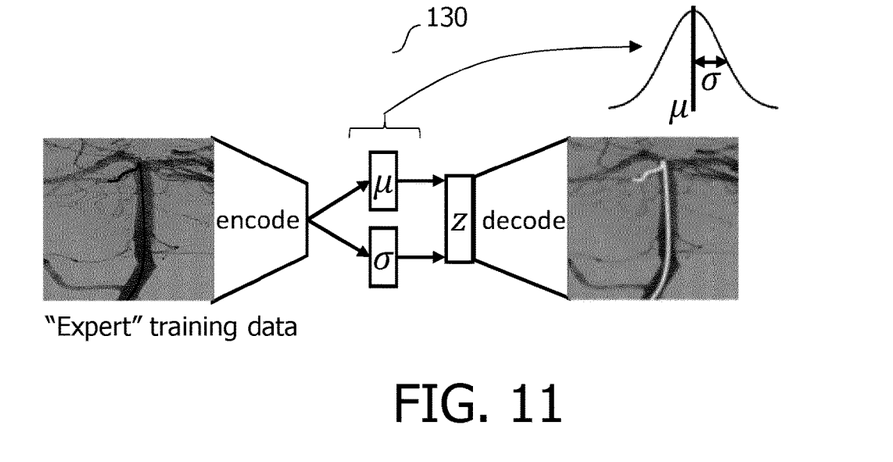
FIG. 11 illustrates an example of a neural network 130 that is configured to determine, from the inputted interventional device shape data for a non-expert user, the predicted future position of the one or more portions of the interventional device that most closely matches the interventional device shape training data for an expert user.

FIG. 11 illustrates an example of a neural network 130 that is configured to determine, from the inputted interventional device shape data for a non-expert user, the predicted future position of the one or more portions of the interventional device that most closely matches the interventional device shape training data for an expert user, in accordance with some aspects of the disclosure. In this example, the interventional device shape training data comprises expert user training data, and the neural network 130 is configured to determine, from the inputted interventional device shape data 110 for a non-expert user, the predicted future position 140 of the one or more portions of the interventional device 120 at the one or more future time steps $t_{n+1 \ldots n+k}$ to successfully navigate the interventional device 120 to intercept the target position within the anatomy that most closely matches the interventional device shape training data for an expert user at the one or more future time steps $t_{n+1 \ldots n+k}$.

In this example, since the neural network was trained on expert data, the approximate distribution over the input data captured by the latent representation of device trajectories learned by the network represents expert device trajectories. Therefore, the neural network 130 is unable to reconstruct non-expert device trajectories, and which would be outliers to the learned distribution. Instead, it will output the closest expert trajectory that can be represented by the learned distribution. This allows the non-expert user to continually learn to mimic experts without additional time commitment from experts.

An additional advantage of using a variational encoder-decoder networks as illustrated in FIG. 11 is that the learned distribution over the latent space of expert device trajectories follows a normal distribution and can be sampled from. Traditional planning tools typically only show one specific plan or device trajectory, whereas the variational encoder-decoder network described herein can not only show the most likely trajectory or the closest expert trajectory, but also allow users to sample other similar trajectories that, for instance, lead to a known target.

Figure 12:
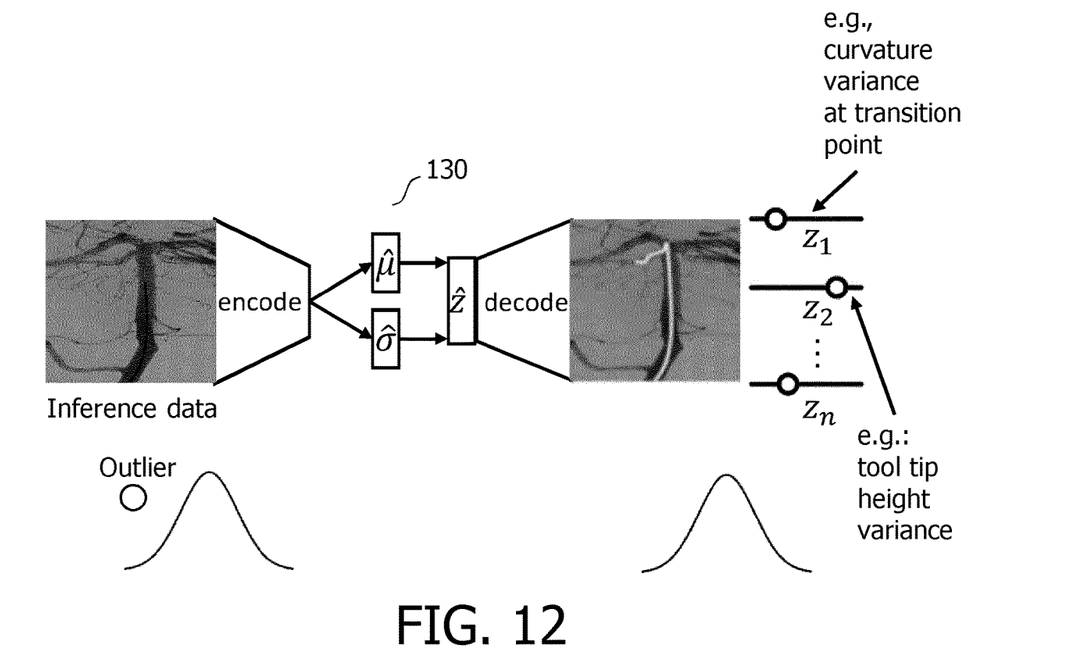
FIG. 12 illustrates an example of the performance of inference with the trained neural network illustrated in FIG. 11, in accordance with some aspects of the disclosure.

FIG. 12 illustrates an example of the performance of inference with the trained neural network illustrated in FIG. 11, in accordance with some aspects of the disclosure. The learned latent representation, z, in FIG. 12 includes multiple vector elements, $z=\{z_1, z_2, \ldots z_j\}$. Each element of z controls some mode of variance in the training data, in the present case, expert device trajectories. For instance, one element of z may control the variance in the curvature at the transition point of a guidewire during a procedure, and another element of z may control the position of the tool tip at the cannulation site. Allowing users to vary one or more elements of learned latent representation z that control some previously identified aspect of the device trajectory makes it possible for users to observe multiple expert device trajectories and select the option best suited for their personal preference, style, comfort, etc. Again, this allows users to accelerate their transition from non-expert to expert whilst allowing users to personalize their style or approach. In accordance with this example, the neural network described with reference to FIG. 8 may include a user interface permitting a user to manipulate one or more elements of the vector of latent variables representing the distribution of positions of portions of the inputted interventional device shape data 110, and thereby allow a user to investigate alternative future shapes of the interventional device that might be obtained from the shape of the interventional device at the current time step $t_n$.

Figure 13:
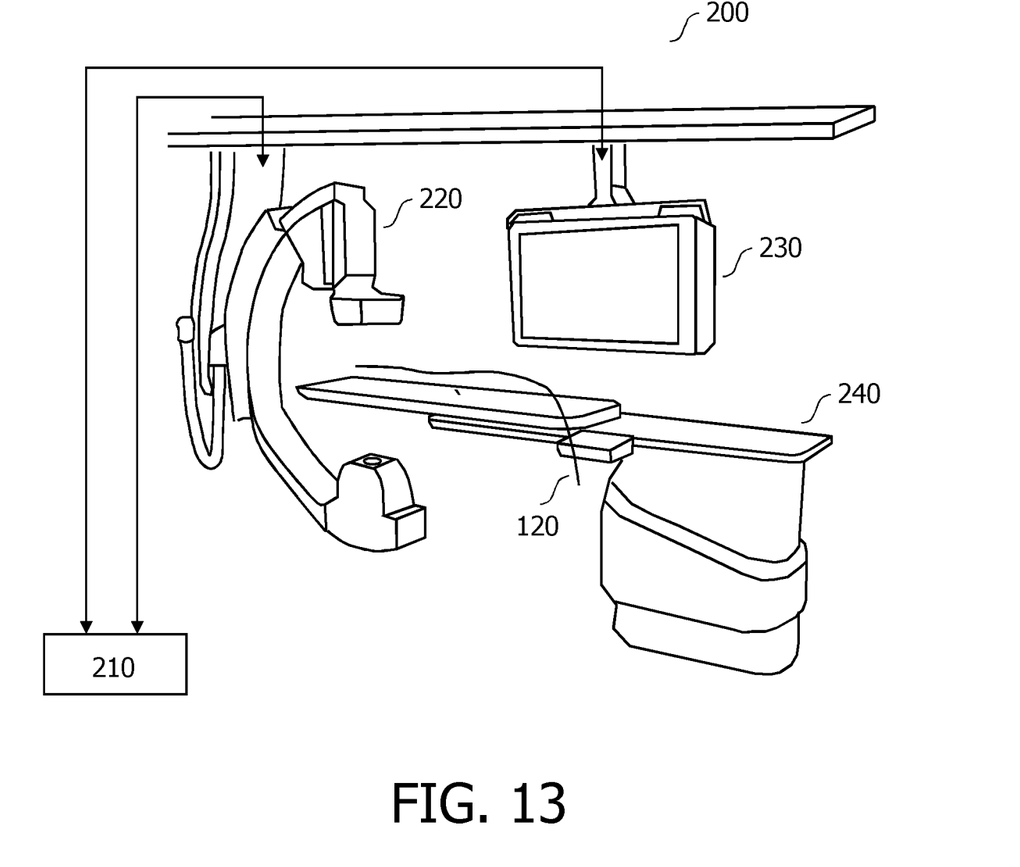
FIG. 13 is a schematic diagram illustrating a system 200 for predicting positions of portions of an interventional device, in accordance with some aspects of the disclosure.

FIG. 13 is a schematic diagram illustrating a system 200 for predicting positions of portions of an interventional device, in accordance with some aspects of the disclosure. The system 200 includes one or more processors 210 that are configured to perform one or more of the operations described above in relation to the computer-implemented method of providing navigation guidance. The system 200 may also include an interventional device 120, an imaging system, such as the X-ray imaging system 220 illustrated in FIG. 13, or another imaging system. In-use, the X-ray imaging system 220 may generate interventional device shape data 110 for inputting into the neural network 130 in the operation S120. The system 200 may also include one or more display devices 230 as illustrated in FIG. 13, and/or a user interface device such as a keyboard, and/or a pointing device such as a mouse for controlling the execution of the method, and/or a patient bed 240.

The above examples are to be understood as illustrative of the present disclosure, and not restrictive. Further examples are also contemplated. For instance, the examples described in relation to computer-implemented methods, may also be provided by the computer program product, or by the computer-readable storage medium, or by the system 200, in a corresponding manner. It is to be understood that a feature described in relation to any one example may be used alone, or in combination with other described features, and may be used in combination with one or more features of another of the examples, or a combination of other examples. Furthermore, equivalents and modifications not described above may also be employed without departing from the scope of the invention, which is defined in the accompanying claims. In the claims, the word "comprising" does not exclude other elements or operations, and the indefinite article "a" or "an" does not exclude a plurality. The mere fact that certain features are recited in mutually different dependent claims does not indicate that a combination of these features cannot be used to advantage. Any reference signs in the claims should not be construed as limiting their scope.

The invention claimed is:

1. A computer-implemented method of providing navigation guidance for navigating an interventional device within an anatomy, the method comprising:
    receiving interventional device shape data representing a shape of the interventional device at one or more time steps, the one or more time steps including a shape of the interventional device at one or more time steps, the one or more time steps including at least a current time step;
    predicting, based on the interventional device shape data, a future position of one or more positions of the interventional device at one or more future time steps, and a corresponding confidence estimate for the one or more future positions of the interventional device at the one or more future time steps; and
    displaying the predicted future position of the one or more portions of the interventional device at the one or more future time steps, and the corresponding predicted confidence estimate for the one or more future positions of the interventional device at the one or more future time steps.

2. The computer-implemented method according to claim 1, wherein the method comprises:
    receiving input indicative of a target position within the anatomy, for at least one portion of the interventional device; and
    computing, based on the predicted future position of the at least one portion of the interventional device, a probability of the at least one portion of the interventional device intercepting the target position.

3. The computer-implemented method according to claim 1, wherein a neural network is trained to predict the future position, and wherein the neural network is configured to generate one or more vectors of latent variables representing a distribution of positions of portions of the interventional device shape data along a plurality of historic paths used to navigate the interventional device to intercept a target position within the anatomy; and wherein the method comprises:
    displaying a track within the anatomy representing one or more distribution parameters of the one or more vectors of latent variables.

4. The computer-implemented method according to claim 3, wherein the method comprises:
    computing, based on the received interventional device shape data representing the shape of the interventional device for the current time step, one or more required manipulations of the interventional device that are required to reduce a difference between the predicted future position of the one or more portions of the interventional device at the one or more future time steps, and the track within the anatomy; and
    displaying the predicted one or more required manipulations of the interventional device.

5. The computer-implemented method according to claim 4, wherein the neural network is trained to predict, from the interventional device shape data, the one or more required manipulations of the interventional device that are required to reduce a difference between the predicted future position of the one or more portions of the interventional device at the one or more future time steps, and the track within the anatomy, by:
    receiving interventional device shape training data representing the shape of the interventional device at a sequence of time steps for a plurality of historic procedures used to navigate the interventional device to intercept the target position;
    receiving interventional device ground truth manipulation data representing, for each time step in the sequence, a manipulation of the interventional device, and
    for each of a plurality of time steps in the sequence, inputting into the neural network the received interventional device shape training data for the time step, and adjusting parameters of the neural network based on a third loss function representing a difference between the predicted one or more required manipulations, and the ground truth manipulation data, until a stopping criterion is met.

6. The computer-implemented method according to claim 3, wherein the neural network is trained to predict, from the interventional device shape data, the future position of the one or more portions of the interventional device at the one or more future time steps by:
    receiving interventional device shape training data representing a shape of the interventional device at a sequence of time steps for a plurality of historic procedures to navigate the interventional device to intercept the target position within the anatomy;
    receiving interventional device ground truth position data representing a position of each of a plurality of portions of the interventional device at each time step in the sequence; and
    for each of a plurality of time steps in the sequence for a historic procedure:
        inputting into the neural network, the received interventional device shape training data for the respective time step;

training the neural network to learn the one or more vectors of latent variables representing the distribution of positions of portions of the inputted interventional device shape data;

sampling from within the distribution of positions of the portions of the interventional device represented by the one or more vectors of latent variables to provide a future position of the one or more portions of the interventional device at the one or more future time steps;

adjusting parameters of the neural network based on:
i) a first loss function representing a difference between the probability of samples in the distribution represented by the one or more vectors of latent variables, and the probability of samples in a standard distribution; and
ii) a second loss function representing a difference between the predicted subsequent position of the one or more portions of the interventional device at the one or more subsequent time steps, and a ground truth position of the one or more corresponding portions of the interventional device at the one or more subsequent time steps from the received interventional device ground truth position data, until a stopping criterion is met; and repeating the inputting, the training, the sampling and the adjusting for each of the plurality of historic procedures.

7. The computer-implemented method according to claim 6, wherein the interventional device shape training data comprises interventional device shape training data obtained from an expert user, and wherein the neural network is configured to determine, from received interventional device shape data for a non-expert user, the predicted future position of the one or more portions of the interventional device at the one or more future time steps to navigate the interventional device to intercept the target position within the anatomy that most closely matches the interventional device shape training data for an expert user at the one or more future time steps.

8. The computer-implemented method according to claim 3, wherein the neural network comprises a user interface configured to permit a user to manipulate one or more elements of the one or more vectors of latent variables for allowing the user to investigate alternative future shapes of the interventional device that can be obtained from the shape of the interventional device at the current time step.

9. The computer-implemented method according to claim 3, wherein the neural network comprises at least one of:
a convolutional neural network architecture;
a long short term memory (LSTM) neural network architecture;
a variational encoder-decoder neural network architecture;
a generative adversarial (GAN) neural network architecture; or
a transformer architecture.

10. The computer-implemented method according to claim 9, wherein the neural network comprises a LSTM neural network architecture having a plurality of LSTM cells, and wherein each LSTM cell comprises an output configured to predict the future position of a different portion of the interventional device at the one or more future time steps; and
wherein for each LSTM cell, the cell is configured to predict the future position of the portion of the interventional device at the one or more future time steps, based on the inputted interventional device shape data for the current time step, and the predicted future position of one or more neighboring portions of the interventional device at the one or more future time steps.

11. The computer-implemented method according to claim 1, wherein a neural network is trained to predict, from the interventional device shape data, the future position of the one or more portions of the interventional device at the one or more future time steps, by:
receiving interventional device shape training data representing a shape of the interventional device at a sequence of time steps;
receiving interventional device ground truth position data representing a position of each of a plurality of portions of the interventional device at each time step in the sequence; and
for each of a plurality of time steps in the sequence, inputting into the neural network, the received interventional device shape training data for the respective time step, and adjusting parameters of the neural network based on a loss function representing a difference between the predicted subsequent position of the one or more portions of the interventional device at one or more subsequent time steps, and a ground truth position of the one or more corresponding portions of the interventional device at the one or more subsequent time steps from the received interventional device ground truth position data, until a stopping criterion is met.

12. The computer-implemented method according to claim 11, wherein:
i.) the neural network is trained to predict the corresponding confidence estimate for the predicted future position of the one or more portions of the interventional device at the one or more future time steps based on a difference between the predicted future position of the one or more portions of the interventional device at the one or more future time steps generated by the neural network and the ground truth position of the one or more corresponding portions of the interventional device at the one or more future time steps from the received interventional device ground truth position data; or
ii) the neural network comprises a dropout layer configured to randomly control a contribution of neurons in the dropout layer to the predicted future position of the one or more portions of the interventional device at the one or more future time steps, such that a confidence estimate for the predicted future position of the one or more portions of the interventional device at the one or more future time steps is obtainable from the predicted future positions of the one or more portions of the interventional device at the one or more future time steps generated by repetitively executing the neural network.

13. The computer-implemented method according to claim 11, wherein the interventional device shape data comprises a temporal sequence of digital subtraction angiography (DSA) X-ray images including the interventional device, and comprising constraining the adjusting parameters of the neural network such that the predicted future position of the one or more portions of the interventional device at the one or more future time steps, fits within a lumen represented in the DSA X-ray images.

14. The computer-implemented method according to claim 1, wherein the interventional device shape data, or the interventional device shape training data, or the interventional device ground truth position data, comprises one of:
- a temporal sequence of X-ray images including the interventional device;
- a temporal sequence of computed tomography images including the interventional device;
- a temporal sequence of ultrasound images including the interventional device;
- a temporal sequence of magnetic resonance images including the interventional device;
- a temporal sequence of positions provided by a plurality of electromagnetic tracking sensors or emitters mechanically coupled to the interventional device;
- a temporal sequence of positions provided by a plurality of fiber optic shape sensors mechanically coupled to the interventional device;
- a temporal sequence of positions provided by a plurality of dielectric sensors mechanically coupled to the interventional device; or
- a temporal sequence of positions provided by a plurality of ultrasound tracking sensors or emitters mechanically coupled to the interventional device.

15. A non-transitory computer-readable storage medium having stored a computer program comprising instructions which, when executed by a processor, cause the processor to:
- receive interventional device shape data representing a shape of the interventional device at one or more time steps, the one or more time steps including at least a current time step;
- predict, based on the interventional device shape data, a future position of one or more portions of the interventional device at one or more future time steps, and a corresponding confidence estimate for the one or more future positions of the interventional device at the one or more future time steps; and
- displaying the predicted future position of the one or more portions of the interventional device at the one or more future time steps, and the corresponding confidence estimate for the one or more future positions of the interventional device at the one or more future time steps.

16. The non-transitory computer-readable storage medium of claim 15, wherein a neural network is trained to predict the future position, and wherein the neural network is configured to generate one or more vectors of latent variables representing a distribution of positions of portions of the interventional device shape data along a plurality of historic paths used to navigate the interventional device to intercept a target position within the anatomy.

* * * * *